(12) United States Patent
Schleucher

(10) Patent No.: US 7,364,111 B2
(45) Date of Patent: Apr. 29, 2008

(54) REEL CONSISTING OF A METAL STRIP WITH LOOPS

(75) Inventor: Heiko Schleucher, Gedern (DE)

(73) Assignee: Poly-Clip Systems GmbH & Co. KG (DE)

( * ) Notice: Subject to any disclaimer, the term of this patent is extended or adjusted under 35 U.S.C. 154(b) by 28 days.

(21) Appl. No.: 10/541,015

(22) PCT Filed: Nov. 11, 2004

(86) PCT No.: PCT/EP2004/012756

§ 371 (c)(1),
(2), (4) Date: Jun. 2, 2006

(87) PCT Pub. No.: WO2005/047114

PCT Pub. Date: May 26, 2005

(65) Prior Publication Data

US 2006/0261618 A1    Nov. 23, 2006

(30) Foreign Application Priority Data

Nov. 12, 2003 (DE) ................................ 203 17 391

(51) Int. Cl.
*B65H 19/29* (2006.01)
(52) U.S. Cl. .................. 242/580; 24/600.9; 24/698.1
(58) Field of Classification Search ............... 242/580, 242/579, 402, 172, 584.1, 587.1; 24/600.9, 24/601.2–601.4, 601.7–601.9, 698.1–698.3
See application file for complete search history.

(56) References Cited

U.S. PATENT DOCUMENTS

| | | | |
|---|---|---|---|
| 958,877 A | 5/1910 | Kahn | |
| 1,000,676 A | 8/1911 | Gardner | |
| 1,178,056 A | 4/1916 | Craig | |
| 1,275,735 A | 8/1918 | Phillips | |
| 1,557,603 A * | 10/1925 | Morrett | 294/82.19 |
| 2,193,980 A | 3/1940 | Pagenkopf | |
| 2,472,300 A | 6/1949 | Kemplin | |
| 2,513,256 A * | 6/1950 | Sonnenburg | 294/82.24 |
| 2,533,341 A | 12/1950 | Alfano | |
| 2,888,370 A | 1/1959 | Franks | |
| 2,993,588 A | 7/1961 | Kulka | |
| 3,081,869 A | 3/1963 | Higuchi | |
| 3,176,932 A | 4/1965 | Kovaleski | |
| 4,308,641 A | 1/1982 | Niedecker | |
| 4,534,522 A | 8/1985 | Spence | |
| 4,858,977 A | 8/1989 | Mitchell | |

(Continued)

FOREIGN PATENT DOCUMENTS

DE    1 755 265 U    10/1957

(Continued)

*Primary Examiner*—Peter M. Cuomo
*Assistant Examiner*—Sang Kim
(74) *Attorney, Agent, or Firm*—Hahn Loeser & Parks LLP; Michael H. Minns

(57) ABSTRACT

The invention pertains to a reel, which consists of a metal strip with loops, in particular a clip reel for packaging equipment. The reel must have at least three coils with its free end extending into the direction of unwinding. The reel also features a retaining device, which secures a releasable connection between the free end and another metal strip coil or—if available—a spool, thus preventing that the reel unwinds. The invention-based embodiment proposes a shape-mated connection.

7 Claims, 4 Drawing Sheets

U.S. PATENT DOCUMENTS 5,549,257 A 8/1996 Sanda et al.
5,924,643 A 7/1999 Campana

FOREIGN PATENT DOCUMENTS

| DE | 1 778 619 U | 12/1958 |
| DE | 1 871 049 U | 4/1963 |
| DE | 88 02 031.2 U1 | 5/1988 |
| EP | 0 664 406 A1 | 7/1995 |
| GB | 2 253 650 A | 9/1992 |
| SU | 1042835 | 9/1983 |

* cited by examiner

REEL CONSISTING OF A METAL STRIP WITH LOOPS

TECHNICAL FIELD

The invention pertains to the reel of a formed metal strip with regular loops, in particular to a clip reel for packaging equipment. The metal strip must coil around at least three times and its free end must extend into the direction of unwinding. A releasable retaining device connects two points of the metal strip, with one point close to the free end and the second point at another turn of the coil or—if available—at a spool, thus preventing reel unwinding. The invention also pertains to a retaining device for a reel consisting of a metal strip with loops, in particular to a clip reel for packaging machines. The metal strip must coil around at least three times and its free end must extend into the direction of unwinding.

BACKGROUND OF THE INVENTION

A commonly used metal strip reel consists of a continuous row of clips like they are used to seal sausage ends. Adhesive tape is affixed to the free end of this clip reel and the adjacent coils (or a spool, if applicable), thus preventing the unintentional unwinding of the clip reel. Removing this tape is often tedious and eventually residual sticky tape may cause the packaging equipment to malfunction.

SUMMARY OF THE INVENTION

As its objectives, the submitted invention proposes a reel, which does not unwind unintentionally, and a retaining device, both allowing a convenient insertion into the packaging machine. The invention meets these objectives for a reel of the above-described nature through a shape-mated connection. As a result, inserting a reel into the packaging equipment requires no more effort than separating the retaining device from the free end. The reel no longer needs to be cleansed of adhesive tape. Unlike adhesive tape, the retaining device practically never unfastens unintentionally. Once placed correctly on the reel, there is no need to check again whether the reel is firmly secured against unwinding.

The shape-mated connection between the retaining device and the metal strip allows it to exert a relatively large force on a small area. While reels according to today's best available technology require relatively long adhesive tapes with powerful adhesives, the reel according to this invention requires only a small contact point. Accordingly, the retaining device needs to have only small dimensions.

In case the shape-mated connection is placed between the free end of the metal strip and a coil core (spool), the invention-based reel does not even require additional parts and consequently, waste disposal is also redundant. To manufacture the retaining device and the spool independently and to facilitate reel insertion, the preferred retaining device is a separate part with two spatially separated ends.

A shape-mated connection between the free end of the clip reel and the retaining device is best established using a retaining device with a lug ring terminal on the first end and with a hook on the second end. The free end of the clip reel is threaded through the lug ring so that it catches inside one of the loops. The hook grips one of the metal strip loops. To create a shape-mated connection between the retaining device and the metal strip the free end is threaded through the lug ring up to the first loop so that the lug ring reaches through the loop. The hook is then locked in place grasping the loop of another coil, thus creating a secure connection between the free end and the retaining device.

The hook of first choice is a carabiner (snap hook). This hook guards against mechanical release due to accidental coil movement, e.g. during transport. Snapping this hook to a loop is easily done.

The entire retaining device is preferentially made of synthetic material. This allows the fast and cost-effective production of such retaining devices. Casting the retaining device in one piece is the production method of choice.

According to a second aspect, the invention is realized as a retaining device, which consists of a flat shaft with a lug ring on one end and a hook on the opposite end.

In its preferred embodiment, the retaining device features a first end with a lug ring, which connects to the free end of the metal strip. The other end of the retaining device can then be affixed to a loop in another coil.

BRIEF DESCRIPTION OF THE DRAWINGS

The drawings below describe the invention in detail.

DETAILED DESCRIPTION OF THE INVENTION

Figure 1:
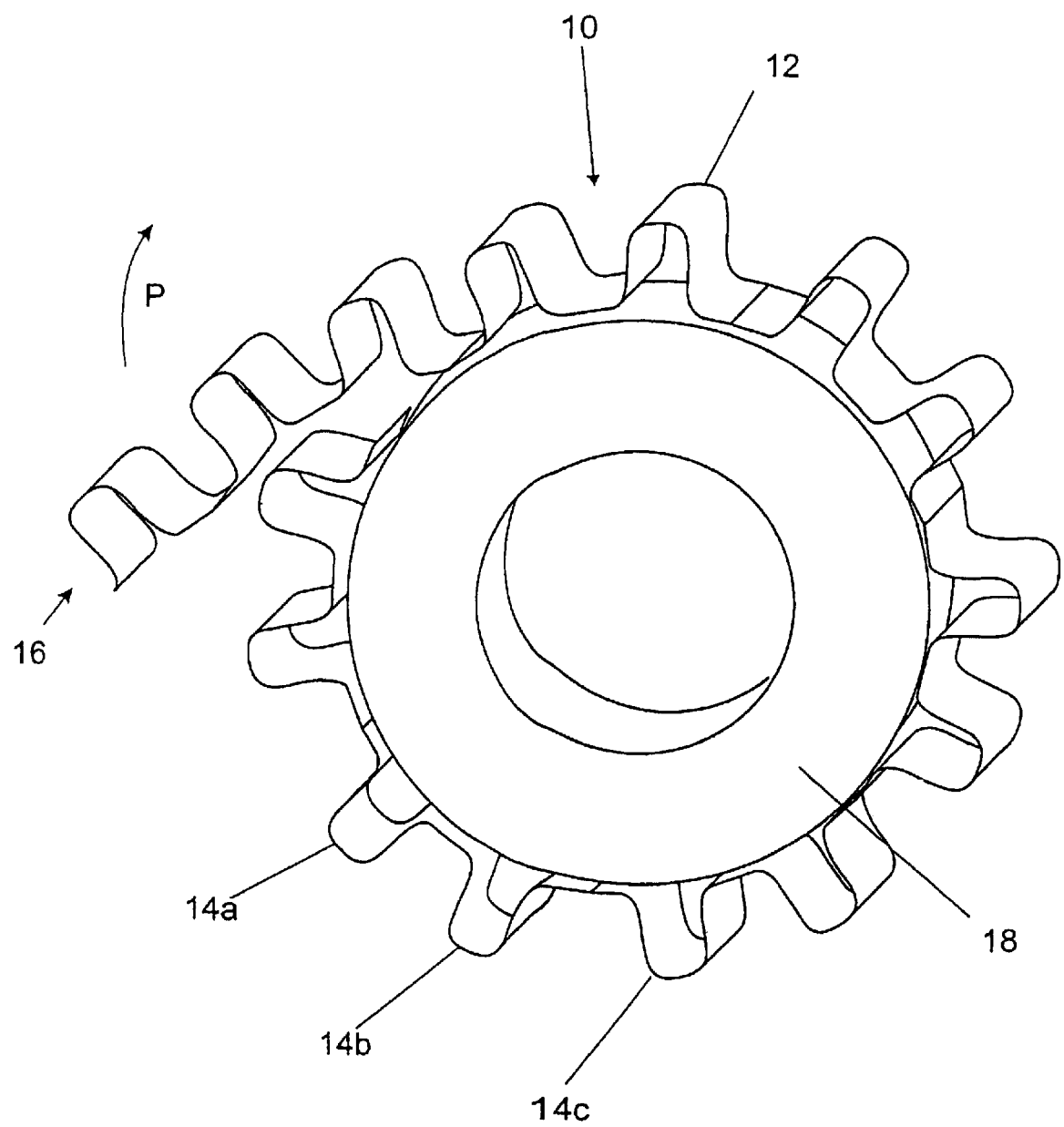
FIG. 1 A perspective schematic diagram of a coil on a spool in side view.

FIG. 1 shows a coil 10, which consist of a metal strip 12 with a series of uprising loops 14a, 14b, 14c. In the embodiment example shown here, the metal strip 12 is shaped into loop structures 14 above the coil base. Splitting the metal strip 12 between adjacent loops creates the clips for the packaging equipment. The base for the metal coil is a spool 18 with only a single turn. The free end of the metal strip extends into the direction of unwinding. Without a retaining device the free end 16 would move away from the spool as indicated by the arrow P.

Figure 2:
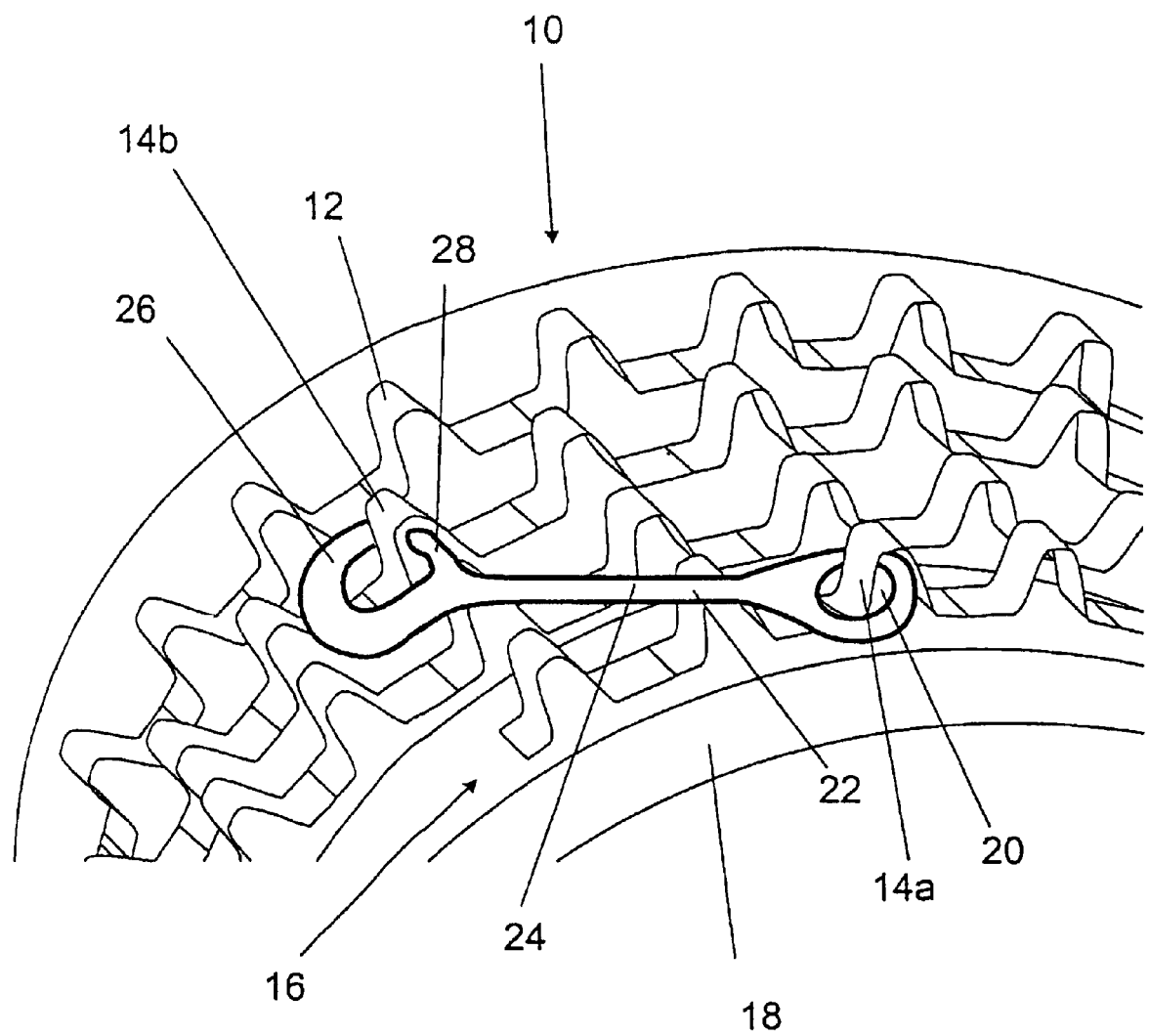
FIG. 2 Perspective view of a coil segment on a spool.

FIG. 2 offers a perspective view of a coil segment 10 on the spool 18 with three coils. Close to the end of the metal strip, the lug ring 20 of the retaining device 22 reaches through the metal strip loop over the coil base. The lug ring 20 is located close to the loop 14a and locks into the loop in a shape-mated connection.

A flat shaft 24 links the lug ring 20 and the hook 26. The hook is executed as carabiner and latches into loop 14b in a shape-mated connection. The catch 28 is part of the carabiner hook and ensures that the retaining device 22 does not disconnect from the metal strip. This mechanism prevents the free end 16 from moving relative to the other coils of the reel 10.

Figure 3:
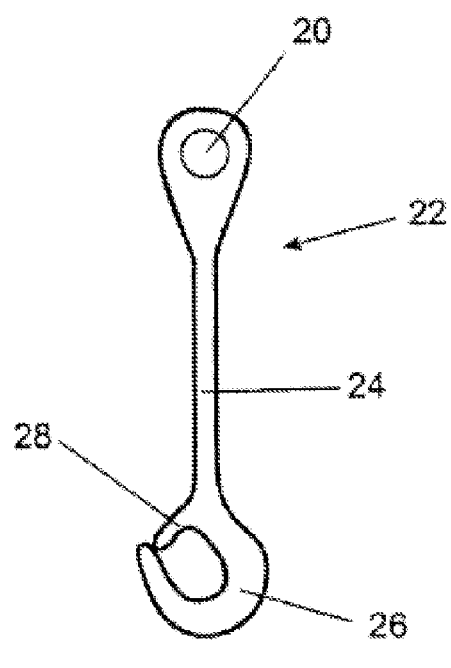
FIG. 3 Retaining device in top view.
Figure 3A:
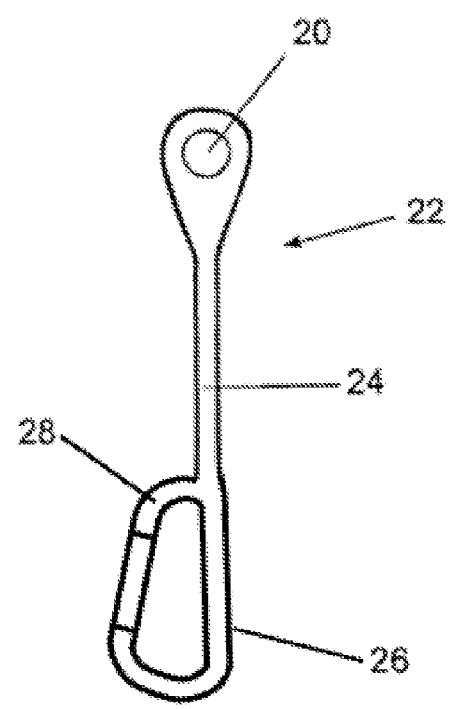
FIG. 3A Alternate of FIG. 3 illustrating a carabiner hook.

FIG. 3 depicts an invention-based retaining device 22. It features a lug ring 20, a flat shaft 24, a hook 26 and a latch 28. The inside diameters of the lug ring 20 and the hook 26 are adjusted so that the affixed retaining device snugly accommodates the entire width of the metal strip 12.

Figure 4:
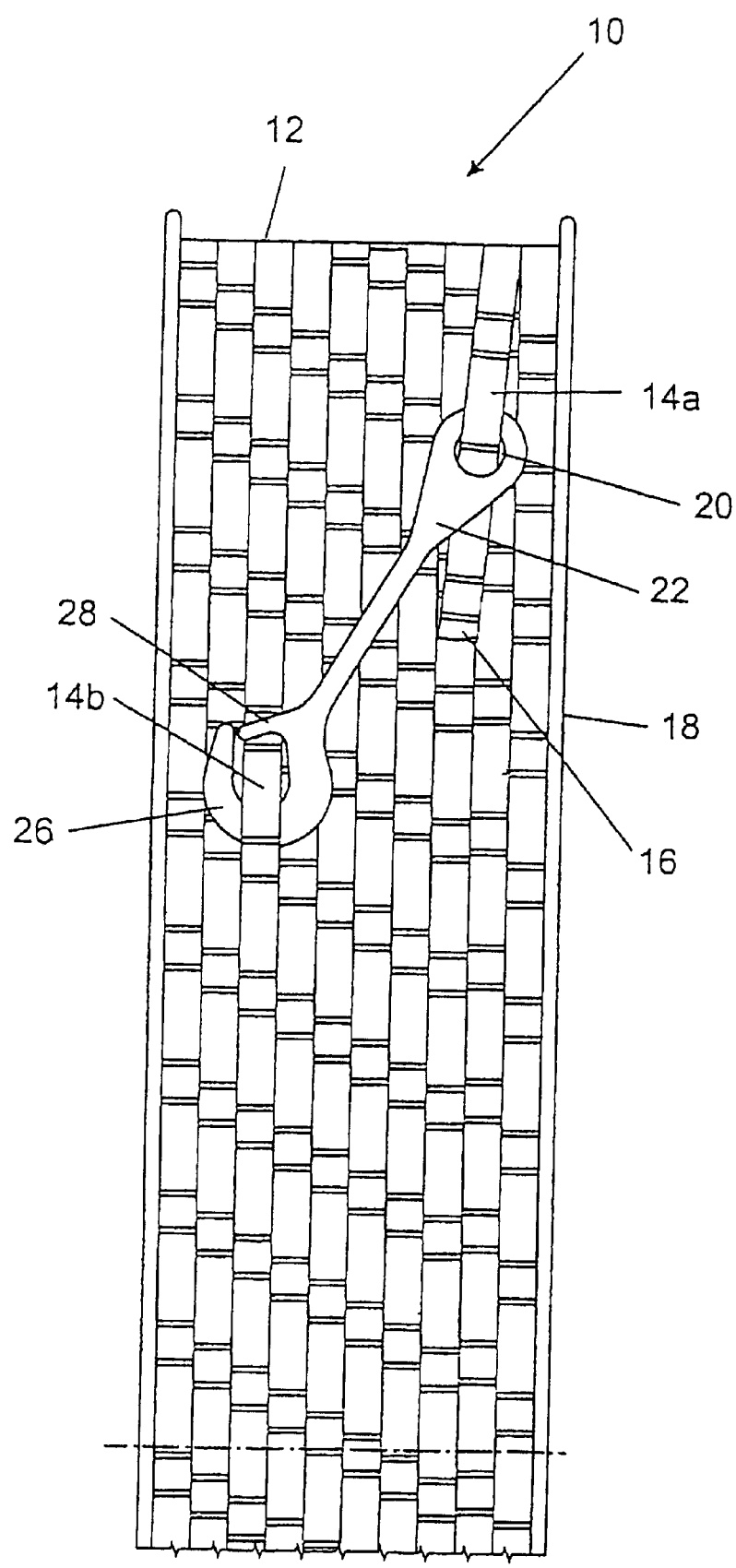
FIG. 4 Coil on a spool in top view.

FIG. 4 shows a reel 10 with ten coils. The markings indicate where the loops extend from the metal strip 12. Loop 14a contains the lug ring 20 to create a shape-mated connection. The hook 26 snaps into loop 14b on a coil other than the one with the free end 16, thus creating the second shape-mated connection. This connection prevents unwinding at the free end 16.

REFERENCE NUMERALS 10 reel
12 metal strip
14 loop
16 free end
18 spool
20 ring lug
22 retaining device
24 flat shaft
26 hook
28 latch

The invention claimed is:

1. A clip reel for use in packaging equipment, the reel comprising:
   a spool;
   a metal strip having a length and a plurality of loops spaced along the length of the metal strip, the metal strip having several coils spiral wound about the spool and a free end of the metal strip extending from one of said several coils into a direction of unwinding of the metal from the spool, and
   a retaining device which forms a releasable connection between two points on the metal strip, a first end of the retaining device engaging the metal strip close to the free end of the metal strip and a second end of the retaining device engaging one of the plurality of loops in a metal strip segment which is part of a different coil than the coil from which the free end of the metal strip extends,
   wherein the formed connection has a shape-mated design which secures the reel against unwinding at the free end.

2. The reel of claim 1, wherein the retaining device comprises two spatially separated functional ends.

3. The reel of claim 2, wherein the first end of the retaining device comprises a lug ring, which catches a first loop of a first coil of the metal strip and snugly accommodates the entire width of the metal strip, and wherein the second end of the retaining device comprises a hook which latches into a second loop of a second coil of the metal strip.

4. The reel of claim 3, wherein the hook is a carabiner hook.

5. The reel of claim 1, wherein the retaining device is made entirely of synthetic material.

6. The reel of claim 5, wherein the retaining device is cast as a one-piece part.

7. A method for preventing a metal strip wound about a spool from unwinding, the method comprising the steps of:
   providing a spool having a metal strip spiral wound about the spool in a plurality of coils, the metal strip having a plurality of loops spaced along a length of the metal strip and a free end extending from one of said plurality of coils;
   providing a retaining device having a shaft, a lug ring at a first end, and a hook at a second end;
   threading the free end of the metal strip through the lug ring of the retaining device until the lug ring is positioned about a first loop of a first coil of the metal strip near the free end;
   latching the hook end of the retaining device into a second loop of a second coil of the metal strip wherein the retaining device prevents the metal strip from unwinding from the spool.

* * * * *